United States Patent [19]

Leopold

[11] Patent Number: 4,628,582

[45] Date of Patent: Dec. 16, 1986

[54] METHOD OF MAKING SPACER FRAME FOR AN INSULATING GLASS PANEL

[75] Inventor: Edmund A. Leopold, Hudson, Ohio

[73] Assignee: Glass Equipment Development, Inc., Twinsburg, Ohio

[21] Appl. No.: 724,822

[22] Filed: Apr. 18, 1985

Related U.S. Application Data

[60] Division of Ser. No. 327,579, Dec. 4, 1981, Pat. No. 4,530,195, which is a continuation-in-part of Ser. No. 136,872, Apr. 4, 1980, abandoned.

[51] Int. Cl.$^4$ .............................................. B23P 11/02

[52] U.S. Cl. ........................................ 29/451; 29/453; 29/458; 118/676; 156/107

[58] Field of Search ................. 29/450, 453, 451, 458; 52/171, 172, 656, 726, 788; 403/231, 292, 295, 401; 428/34, 35; 40/155; 156/107, 109; 118/676, 672

[56] References Cited

U.S. PATENT DOCUMENTS

| | | | |
|---|---|---|---|
| 3,280,523 | 10/1966 | Stroud et al. | 52/172 |
| 3,517,641 | 6/1970 | Boyce | 118/676 |
| 3,989,003 | 11/1976 | Fagan et al. | 118/676 |
| 4,011,706 | 3/1977 | Dupree | 403/321 |
| 4,074,480 | 2/1978 | Burton | 52/172 X |
| 4,116,513 | 9/1978 | Ullman, Jr. | 29/450 X |
| 4,222,209 | 9/1980 | Peterson | 52/172 |
| 4,513,546 | 4/1985 | Gow | 52/172 |

FOREIGN PATENT DOCUMENTS 2438348 6/1976 Fed. Rep. of Germany .

*Primary Examiner*—Charlie T. Moon

*Attorney, Agent, or Firm*—Watts, Hoffmann, Fisher & Heinke

[57] ABSTRACT

A spacer frame assembly for an insulating glass panel is disclosed which is constructed by arranging a plurality of spacer frame segments end to end in substantial alignment, with adjacent frame ends being connected together, and supplying sealant to the aligned spacer frame segments substantially continuously along opposite sides. The adjacent frame segments are then pivoted about axes extending transversely to the opposite sides to form a generally planar polygonal frame configuration and the free ends of the frame are joined.

A connector for adjacent ends of the spacer frame segments is disclosed which includes first and second body portions secured to first and second frame segments, respectively, and hinge structure connecting the body portions for enabling movement of one frame segment relative to the other. The connector body portions are secured relative to each other by connecting structure with the first frame segment in a predetermined angular position with respect to the second frame segment. Free ends of the frame segments are joined by a two part connector.

8 Claims, 12 Drawing Figures

METHOD OF MAKING SPACER FRAME FOR AN INSULATING GLASS PANEL

RELATED APPLICATION

This application is a division of U.S. patent application Ser. No. 327,579 filed Dec. 4, 1981, now U.S. Pat. No. 4,530,195 issued July 23, 1985, and which was a continuation-in-part of U.S. application Ser. No. 136,872, filed Apr. 4, 1980, and now abandoned.

BACKGROUND OF THE INVENTION

1. Field of the Invention

The present invention relates to insulating glass panels or the like and more particularly to an improved panel construction and method of panel fabrication.

Insulating glass panels of the sort commonly used as glazing in windows and doors are normally constructed by sandwiching a spacer frame assembly between sheets of glass, or equivalent material, and hermetically bonding the sheets to the spacer frame assembly. A finished panel is typically square or rectangular with the spacer frame assembly extending completely about and immediately adjacent the outer periphery. The panel can then be installed in a suitable supporting structure (such as a window frame) which masks the spacer frame assembly from view and enables the panel to be installed in a larger structure, such as an exterior building wall.

As its name implies the spacer frame assembly functions to space the glass sheets apart and thus provide an insulative "dead air" space between them. It is essential in such panels that the spacer frame assembly be and remain hermetically attached to the glass sheets throughout the expected life of the panel. If the air space between the glass sheets is not hermetic, atmospheric water vapor will eventually infiltrate the dead air space and inevitably, under appropriate atmospheric conditions, condense on the glass surfaces bounding the dead air space. While the presence of water vapor in the dead air space does not materially reduce the insulative effectiveness of the panel, condensation on the glass in the space "fogs" the glass, cannot be removed and the utility of the panel as a window is adversely affected. Moreover, repeated condensation and evaporation of such moisture within the panels results in the windows becoming permanently stained and unsightly even when there is no condensation in the panel.

2. The Prior Art

In order to assure a hermetic bond between the spacer frame and the glass sheets a mastic-like sealant material has been applied to opposite sides of the spacer frame continuously about the panel. A typical sealant material, known in the industry as a Butyl "hot melt" adhesive, is applied to the spacer frame, the spacer frame assembly is sandwiched between the glass sheets, and the panel is subjected to high energy radiant heating while the glass sheets are pressed against the spacer frame assembly. The sealant is heated sufficiently to "melt" and flow into sealing and bonding contact between the glass and the spacer frame. Upon cooling, and in use, the sealant material is relatively rigid although it does tend to exhibit plastic flow characteristics under stress.

In use the insulating glass panels are subjected to appreciable temperature differentials and to frequent temperature "cycling." The spacer frames therefore have been subjected to stresses and strain resulting from temperature induced differential expansion and contraction. In panels where the spacer frame segments were not firmly secured together, the applied stresses sometimes resulted in the frame segments shifting apart and causing the sealant material to deform sufficiently to break the seal between the frame and the glass. While the structural integrity of the panels was not usually adversely affected, the broken seals permitted migration of atmospheric moisture into the dead air space.

Accordingly the use of corner connectors between spacer frame segments for securing the segments together and rigidifying the corners was proposed. The corner connectors were usually formed of relatively rigid plastic or zinc alloy materials and when attached to the frame segments provided sufficient strength to maintain the integrity of the spacer frame assembly.

Even though insulating glass panel components were hermetically bonded together and the seal remained intact, atmospheric moisture was trapped in the air space when the panels were being assembled. The trapped air-borne moisture often condensed within the panels. In order to avoid this problem the prior art proposed the use of tubular spacer frame segments containing particulate desiccant material. The spacer frame segments were constructed from aluminum or galvanized sheet steel and formed with slightly open interiorly facing seams which permitted the segments to "breathe," i.e., the seams enabled communication between the desiccant material and the panel air space while preventing loss of desiccant into the air space. The desiccant material was effective to dehumidify the air trapped in the panel air space.

The construction of the spacer frames and panels was complicated by the use of desiccant materials in the frame segments. In order to prevent dumping the desiccant material out of the frame segments the frame segments were filled with desiccant material and assembled together using corner connectors which both plugged the ends of the frame segments and formed the spacer frame corners.

Applying the sealant material to the spacer frame was accomplished by moving one side of the spacer frame past two or more sealant extrusion nozzles at a controlled rate of travel and repeating the process for each side of the polygonal spacer frame.

The spacer frame assembly thus formed had a doubled layer of the sealant at each corner of the frame. These layers had to be manually smoothed out and feathered into the single sealant layers adjacent the frame corners to assure that an effective seal could be provided with the glass sheets.

This assembly process was most effectively performed by using two sealant extrusion machines with an operator for each machine being responsible for applying the sealant to the frames. The frame assemblies from each extrusion machine were then placed on a respective table where a finishing operator smoothed the sealant at the corners. An inspector was usually present to inspect the frame assemblies after the finishing operators had completed their ministrations.

Assembly of the panels was then completed in the manner described previously.

The spacer frame assembly process was relatively slow because of the multiple step sealant applying procedure. The extrusion machine had to be started and stopped repeatedly during the application of sealant to a single spacer frame and the sealant was usually applied at a relatively low application rate. Furthermore, application of the coatings was often difficult and cumbersome for the extrusion machine operator, particularly when large size frames had to be coated. For example, when spacer frames for sliding glass door panels were coated, the frames themselves were sometimes six feet long, or longer, per side and although the frame segments were securely connected together, the frames were still quite flexible and thus extremely difficult for the operator to manipulate.

The assembly process was labor intensive and therefore costly since five persons were required to produce spacer frame assemblies insulating glass panel production equipment. It should be noted that spacer frames cannot effectively be produced and stockpiled for eventual use without risking loss of effectiveness of the desiccant material in the frame segments before final assembly of the panels.

SUMMARY OF THE INVENTION

The present invention provides a new and improved method of constructing a spacer frame for an insulating glass panel or the like wherein frame segments are arranged end to end in substantial alignment with adjacent ends connected together, sealant is applied to the aligned segments substantially continuously along opposite sides, adjacent frame segments are pivoted relative to each other to form the spacer frame configuration, and the free ends are attached together to complete the assembly.

In accordance with a preferred form of the invention the frame segments have their adjacent ends hinged together to facilitate pivoting the frame segments to form the finished frame configuration. The adjacent spacer frame segments are structurally connected together after being pivoted to their desired relative orientations to rigidify the frame assembly.

In accordance with another feature of the invention a new and improved frame segment connector is provided which has first and second body portions engaged with adjacent frame segment ends and hinge structure between the body portions to permit pivoting the frame segments to their desired positions. The connector body portions are secured with respect to each other by a connecting arrangement when the frame assembly is complete.

One preferred frame segment connector employs a connecting element projecting from one body portion and engageable with the other body portion to secure the body portions with respect to each other. The connecting element is resiliently deflectable and moves into latching engagement with the other body portion.

In another preferred construction first and second connecting elements extend into latching engagement with respective first and second keeper surfaces on the second and first body portions.

The body portions are preferably telescoped into engagement with the frame segments and prevent loss of desiccant material from the frame segment ends.

The opposite free ends of the aligned frame segments are closed by coacting end connectors which are constructed to be locked together to complete the spacer frame assembly while preventing dumping the desiccant from the ends of the aligned frame segments during handling.

Other features and advantages of the invention will become apparent from the following detailed description of a preferred embodiment made with reference to the accompanying drawings which form part of the specification.

DESCRIPTION OF A PREFERRED EMBODIMENT

Figure 1:
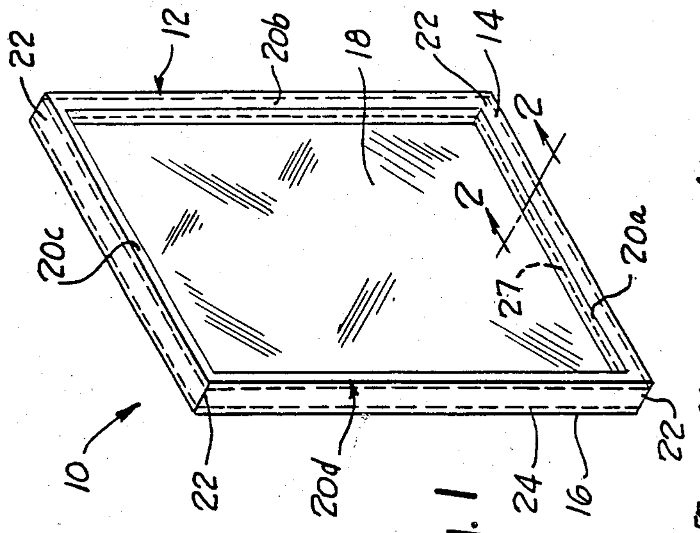
FIG. 1 is a perspective view of an insulating glass panel constructed according to the invention.
Figure 2:
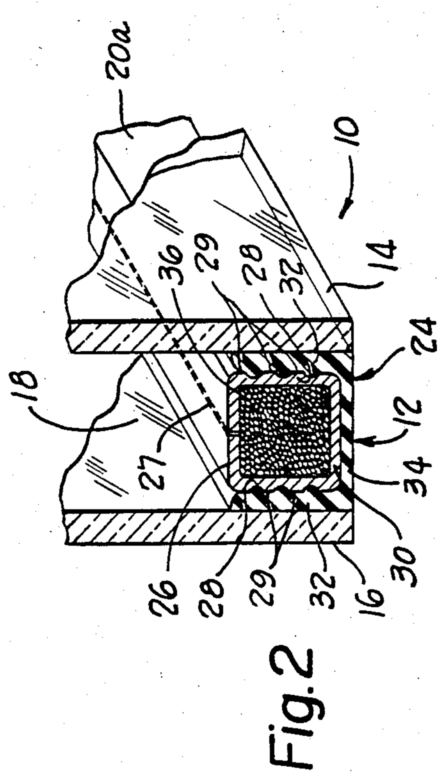
FIG. 2 is a fragmentary cross sectional view of part of the panel seen approximately from the plane indicated by the line 2—2 of FIG. 1.

An insulating glass panel 10 constructed in accordance with the present invention is illustrated by FIGS. 1 and 2 of the drawing. The insulating glass panel 10 includes a spacer frame assembly 12 sandwiched between sheets of glass 14, 16, or equivalent material, and bonded in place to the glass sheets 14, 16 to provide a hermetic air space 18 bounded by the sheets and the spacer frame assembly.

The spacer frame assembly 12 extends completely about the outer periphery of the panel 10 adjacent the peripheral edges of the sheets 14, 16 and is formed by frame segments 20*a*, 20*b*, 20*c*, 20*d* each forming one side of a rectangular generally planar spacer frame. The frame segments are joined at their ends to define frame corners 22. The illustrated frame assembly 12 also includes a sealant body 24 which extends about the outer periphery of the panel 10 as well as between the frame segments and sheets 14, 16. The sealant body 24 assures that the sheets are hermetically bonded to the spacer frame assembly.

In the illustrated embodiment of the invention each frame segment is formed by a thin walled open ended tube. As is best illustrated by FIG. 2 each frame segment has a generally square cross sectional shape and defines a side wall 26 extending along one side of the air space 18 and having a perforate longitudinally extending seam 27; opposite lateral side walls 28 facing the sheets 14, 16, respectively, which are formed with longitudinally extending ribs, or ridges, 29; and, an exteriorly facing wall 30 extending along the outer periphery of the panel 10. The frame segments are preferably formed from aluminum or a light gauge galvanized sheet steel since these materials are sufficiently strong and rigid to function as frame segments, exhibit good corrosion resistance and their structural integrity is not adversely affected by long term exposure to sunlight.

The sealant body 24 includes opposite lateral seal sections 32 extending, respectively, between the frame segment side walls 28 and the adjacent glass panel sheet and an outer peripheral section 34 which is merged with the seal sections 32 and extends laterally between the glass sheets 14, 16 along the exteriorly facing frame segment walls 30. The sealant body 24 is preferably formed of material known in the industry as a Butyl hot melt material which is relatively rigid at room and atmospheric temperatures but can flow under moderate pressure when its temperature is elevated sufficiently above atmospheric temperature levels. The sealant body 24 can be formed from other conventional or suitable materials, if desired. It should be noted that in some panels the outer peripheral sealant body section 34 may be omitted since the lateral sealing sections 32 are sufficient to hermetically join the panel components in place.

In the preferred embodiment of the invention, and as illustrated by FIG. 2, each spacer frame segment is filled with a particulate desiccant material 36 which is in communication with the air space 18 via the perforate seam 27 in the respective frame segment side wall 26. The desiccant material 36 is effective to dehumidify air which is trapped in the space 18 during assembly of the panel 10 so that the possibility of condensation of moisture from air entrapped in the air space 18 is avoided. It should be appreciated that the perforate seam 27 in the frame segments is sufficiently narrow that the desiccant material 36 cannot pass through the seam and into the air space 18.

In accordance with the present invention the spacer frame assembly 12 is constructed by arranging the frame segments 20*a*–*d* end to end in alignment, with adjacent ends of the spacer frame segments connected and applying the sealant body 24 to the aligned spacer frame segments in a single operational step from one free end to the other. The frame segments are then pivoted with respect to each other about their adjacent ends and the free spacer frame segment ends are connected to complete the spacer frame assembly.

Figure 3:
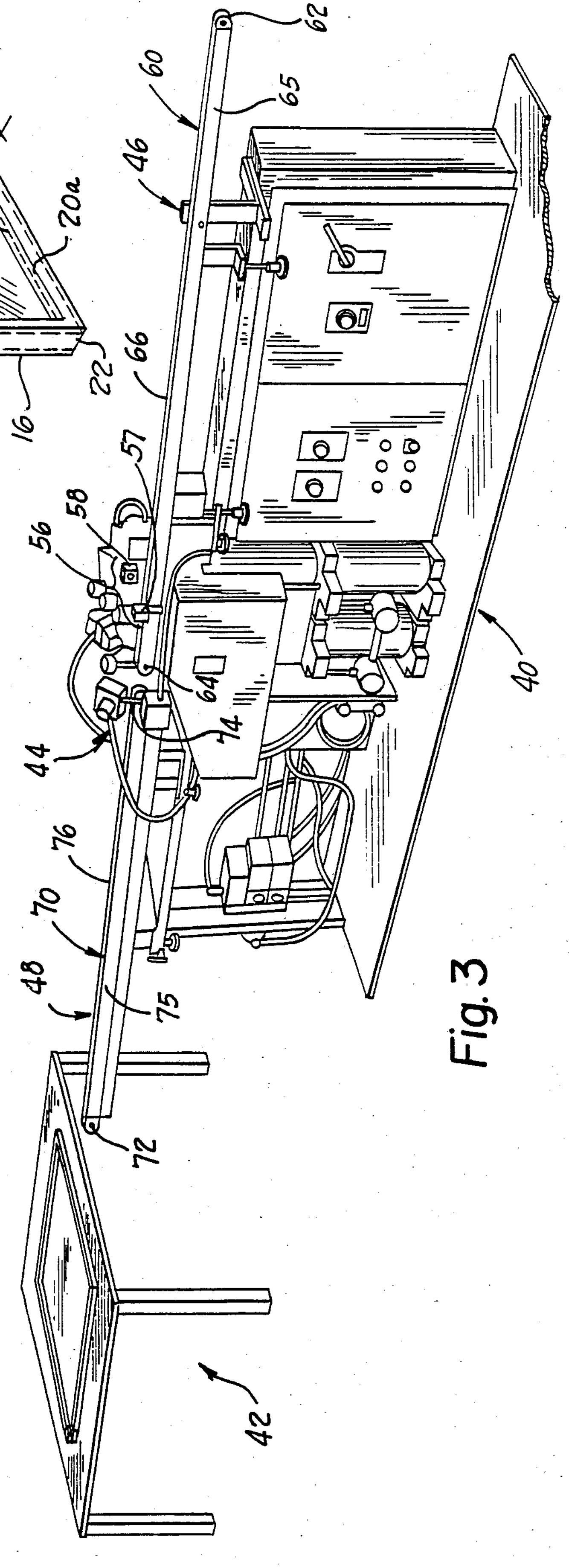
FIG. 3 is a perspective view of apparatus used for construction of the panel of FIG. 1.
Figures 4, 5, 6, 7, 8:
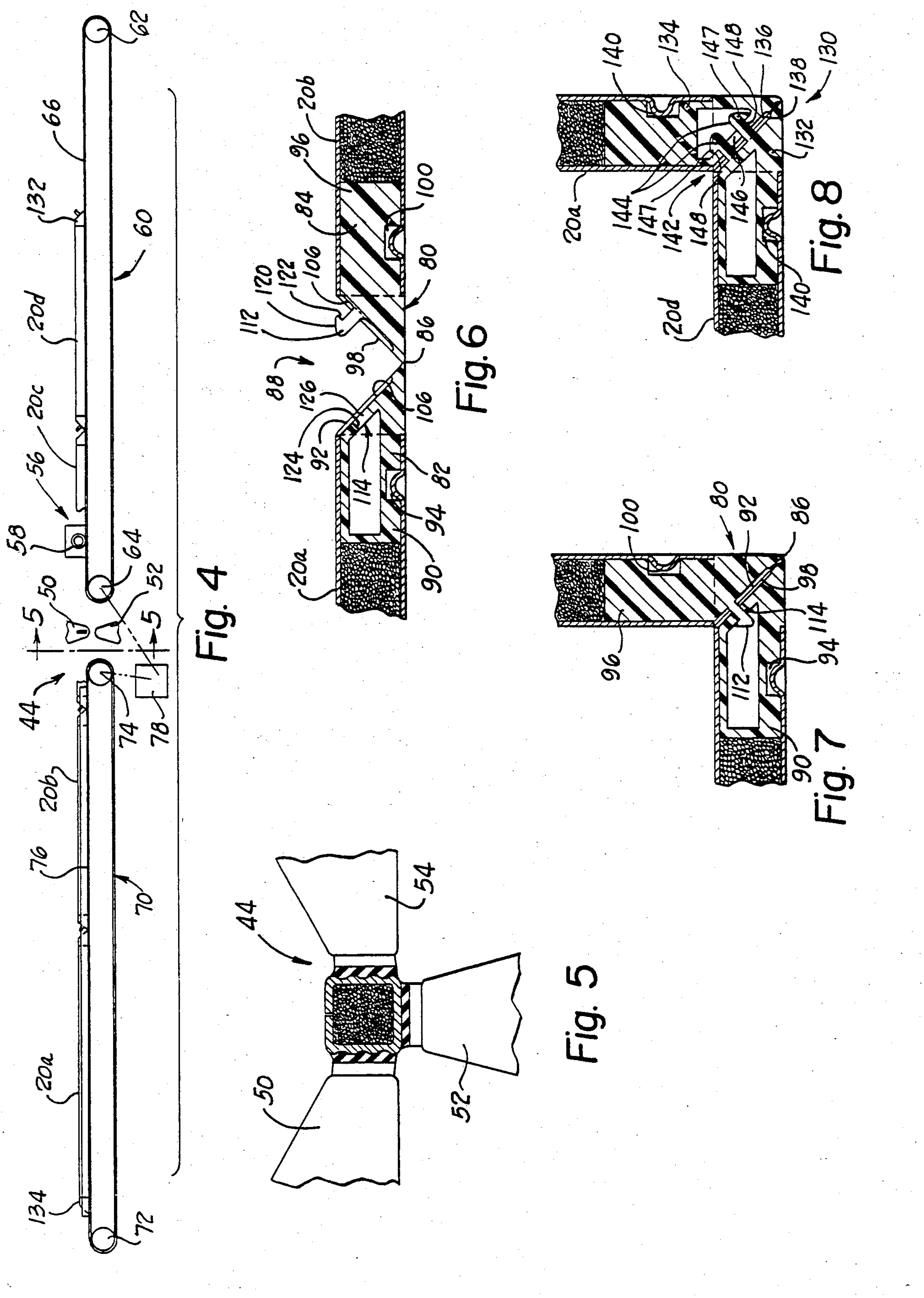
FIG. 4 is a schematic elevational view of part of the apparatus of FIG. 3.
FIG. 5 is a cross sectional view seen approximately from the plane indicated by the line 5—5 of FIG. 4.
FIG. 6 is a fragmentary cross sectional view of a corner connector for a panel spacer frame constructed according to the invention.
FIG. 7 is a view similar to FIG. 6 but with parts in different relative positions.
FIG. 8 is a cross sectional view of another corner connector constructed according to the invention.
Figure 9:
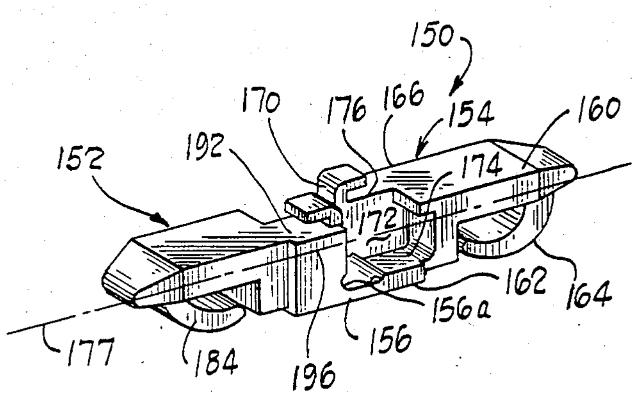
FIG. 9 is a perspective view of a modified connector constructed according to the present invention.
Figure 10:
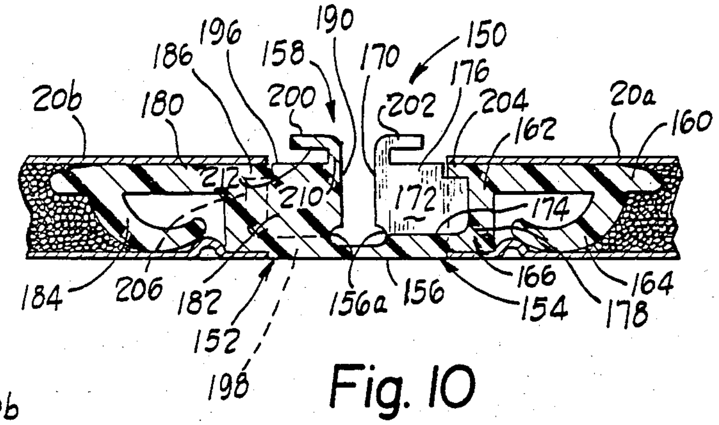
FIG. 10 is a cross sectional view of the connector of FIG. 9 assembled to frame segments.

FIGS. 3–5 illustrate apparatus preferably utilized in carrying out the new method of spacer frame construction including a sealant applying machine 40 and frame assembly table 42 (see FIG. 3). The machine 40 is preferably a sealant extrusion machine defining a sealant application station 44 and including frame segment conveyors 46, 48 for respectively feeding connected, aligned frame segments to and delivering them from the sealant application station 44. The illustrated machine 40 includes three sealant extrusion nozzles 50, 52, 54 (see FIG. 5) disposed at the station 44 and each of which directs a ribbon-like strip of extruded sealant onto frame segments passing through the station 44. The sealant material adheres to the frame segments so that the frame segments delivered from the application station carry a strip of the sealant material on their lateral side walls 28 and their outer walls 30.

Operation of the machine 40 during the sealant applying procedure is controlled by a frame segment sensor 56 located adjacent the conveyor 46 near the station 44. When the leading free end of a series of aligned spacer frame segments on the conveyor 46 is fed to the sensor location the sensor 56 activates the machine 40 after a brief interval so that sealant is extruded from the nozzles 50, 52, 54 just as the leading segment end arrives at the nozzles. The leading spacer frame end thus emerges from the station 44 with the sealant strips adhering to the frame segment walls and projecting just slightly forwardly of the free end.

The sensor 56 maintains the machine 40 in operation until the trailing end of the frame segments passes the sensor location. The sensor then terminates operation of the machine after a second, brief interval which is sufficiently long to assure that the trailing frame segment end has passed through the station 44 and that the strips of sealant have been applied at least completely to the trailing free end of the free segments. In the preferred machine 40 the sensor 56 is formed by a lamp 57 and a photocell 58 disposed respectively on opposite sides of the conveyor 46 adjacent the station 44. The frame segments interrupt a beam of light directed from the lamp to the photocell to enable operation of the machine 40. The photocell is preferably associated with an adjustable timer (not illustrated) to control the intervals referred to.

The conveyors 46, 48 operate to move the frame segments through the station 44 at a constant speed which is related to the rate of extrusion of sealant through the nozzles 50, 52, 54 so that continuous constant thickness layers of sealant are applied to the frame segments. The conveyor 46 is formed by an endless belt 60 trained around rollers 62, 64 which are rotatably supported at opposite ends of a supporting frame 65. The belt 60 defines an upper reach 66 for supporting the frame segments while they are fed to the station 44.

The conveyor 48 is formed by an endless belt 70 which is trained around rollers 72, 74 rotatably supported on opposite ends of a conveyor supporting frame 75. The belt 70 defines an upper reach 76 for supporting the spacer frame segments as they are delivered from the station 44. The belts 60, 70 are driven at identical surface speeds by a common drive mechanism 78 schematically illustrated in FIG. 4 and associated with the rollers 64, 74 adjacent the station 44.

Hold down rollers (not illustrated) are preferably disposed over the belts 60, 70 adjacent the station 44 to maintain the frame segments properly aligned with the extrusion nozzles as the segments pass through the station.

The extrusion machine 40 is schematically illustrated and only briefly described because it can be of any suitable conventional construction. The illustrated machine 40 is a Hot Melt Extruder, Type HME-55-PHE which can be purchased from Glass Equipment Development, Inc. of Twinsburg, Ohio. In practice the sealant applying procedure is performed as follows: Frame segments 20*a*–20*d* are filled with desiccant material (which is retained in the segments by suitable means) and the segments are aligned, with their adjacent ends connected, on the conveyor 46. The conveyor 46 is operated to deliver the segments to the station 44 and sealant is extruded onto the segments under control of the sensor 56. The coated frame segments are delivered from the station 44 by the conveyor 48 and when the segments have been fully coated and extend along the conveyor 48 the conveyor operation terminates briefly to allow succeeding frame segments to be loaded onto the conveyor 46.

When the sealant applying procedure has been completed the spacer frame segments are removed from the delivery conveyor 48 and placed on the assembly table 42 where the frame segments are pivoted relative to each other at their adjacent ends and the free ends of the frame are connected together to complete the spacer frame assembly. The sealant material on the side walls 28 tends to bow slightly at the frame corners when the pivoting operation takes place and the frame assembler therefore smooths out the sealant at the frame corners as well as manually molding the sealant into a continuous mass at the now joined frame segment free ends. The frame assembler also inspects the finished frame assembly to be certain the sealant is properly adhered and correctly placed on the frame segments. Because of the sealant strip continuity along the frame segments, further inspection of the finished frame assemblies by a separate operator is not a necessity.

After the spacer frame assembly is completed at the table 42 the frame assemblies are delivered to a panel assembly location where the frame assemblies are sandwiched between glass sheets and fed into a heating oven. The panel assembly moves through the oven while the sheets are compressed against the spacer frame assembly. The hot melt material is heated and flows into intimate contact with the glass sheets and the frame segments. The hot melt material also flows sufficiently that the strips of hot melt material on the frame segment side walls flow into and merge with hot melt strip on the frame segment outer wall 30.

The panel construction apparatus and procedures are conventional and therefore are not illustrated or described further here.

An important feature of the new spacer frame assembly procedure resides in connecting adjacent spacer frame segments together for pivoting motion relative to each other and attaching the free ends of aligned spacer frame segments to complete the spacer frame assembly. FIGS. 6–8 illustrate frame segment connectors constructed in accordance with the invention which are particularly adapted for facilitating construction of the spacer frame assembly 12.

FIGS. 6 and 7 illustrate a frame segment connector 80 for hinging adjacent ends of the spacer frame segments to enable alignment of the segments for sealant application and yet provide for relatively strong, durable frame assembly corners. The connector 80 comprises first and second body portions 82, 84 secured to adjacent ends of respective first and second frame segments 20*a*, 20*b*, hinge structure 86 connecting the body portions together to enable pivoting motion of the segments 20*a*, 20*b* about their juncture and a connecting arrangement 88 for securing the body portions in place with respect to each other when the frame segments are in their desired final orientation.

The body portion 82 includes an end section 90 projecting into telescopic engagement with the frame segment 20*a* and a locating face 92 extending from the frame segment end. The preferred end section 90 extends into the open end of the frame segment 20*a* to plug the end and prevent loss of desiccant material and therefore has a cross sectional shape which closely conforms to the internal cross sectional shape of the frame segment tube.

The end section 90 is mechanically locked in place to the frame segment. The end section 90 defines a locking recess 94 into which part of the outer frame segment wall extends to fix the body portion with respect to the frame segment. The outer frame segment wall is preferably yielded by a crimping tool which deforms the wall material into the recess 94 for locking the connector body end section in place.

The connector body portion 84 comprises an end section 96 projecting into telescopic engagement with the frame segment 20*b* and a locating face 98 extending from the end of the frame segment. The end section 96 preferably extends within the frame segment end to plug the end against loss of desiccant and thus has a cross sectional shape which conforms closely to the cross sectional shape of the interior of the frame segment tube. A locking recess 100 formed in the end section 96 receives a projecting portion of the frame segment outer wall 30 to lock the end section 96 in the tube. The frame segment tube material is upset to extend into the recess 100 in the manner described above.

The hinge structure 86 is disposed between body portions 82, 84 to enable the frame segments to be pivoted with respect to each other during assembly of the spacer frame and in the preferred embodiment the hinge structure is formed by a thin strip of flexible material which is integral with the body portions and extends between them continuously throughout their lateral extent.

The connector 80 is preferably formed from a single piece of plastic material, such as nylon, polypropylene or polyethylene plastic, which is molded so that the hinge strip is continuous with the body portions. The hinge strip is sufficiently then to provide adequate flexibility for pivoting the frame segments to form a frame corner yet strong and rigid enough to resist the frame segments being skewed with respect to each other when the corner has been formed and the spacer frame subjected to differential temperature induced stresses, etc.

The locating, or abutment, faces 92, 98 of the body portions preferably extend at angles with respect to the direction of extent of the associated frame segments and engage, or at least closely confront each other, when the frame segments are in their final relative assembled positions. Thus, in the case of a square or rectangular spacer frame assembly the faces 92, 98 extend at complementary included angles so that they engage or closely confront each other when the frame segments form a 90° angle corner. The faces 92, 98 prevent the frame segments from being pivoted to form less than a 90° corner and thus protect the hinge from being overstressed.

As indicated previously, when the frame segments are pivoted into their final positions after the sealant is applied, the sealant strips tend to wrinkle or bow a bit along the opposite frame segment sides at the corners. In some instances it is possible for the sealant strips to be displaced so that they extend partially between the body portions 82, 84. The faces 92, 98 are therefore provided with central relieved areas 106 which provide space for accomodating such sealant and in so doing permit the remainder of the faces to engage or substantially engage when the frame is assembled.

Any suitable means can be used to secure or bond the connector body portions together when the frame is assembled. In the preferred embodiment of the invention the connecting arrangement 88 is a latching device which automatically secures the body portions 82, 84 in position with respect to each other when the associated frame segments are pivoted to form a 90° corner. The latching device includes a latching projection 112 integral with the body portion 82 and a keeper 114 carried by the body portion 84.

The latching projection 112 is formed continuously with the body portion 82 and defines a ramp 120 at its projecting end terminating in a catch surface, or shoulder, 122 which is engageable with the keeper 114. The keeper 114 is formed by a side wall 124 of an opening 126 in the body portion 84.

When the associated frame segments are pivoted to their final relative positions the latching projection 112 moves into the opening 126 with the ramp 120 engaging the wall 124 and resiliently deflecting the projection 112. When the ramp moves beyond the wall 124 the latching projection snaps back to its undeflected position and the catch surface 122 engages the side wall 124 to lock the body portions in place (see FIG. 7).

The free ends of the spacer frame segments are secured together by a two part connector 130, illustrated by FIG. 8. The connector 130 includes body portions 132, 134 each fixed to its associated frame segment. Each body portion extends into the open end of the associated frame segment and has a cross sectional shape which is snugly received by the frame segment to plug the tube end against loss of desiccant. Locating faces 136, 138 on the respective body portions extend at complementary angles from the frame segment ends and engage or closely confront each other when the frame segment free ends are connected together. The body portions each define a locking recess 140 for receiving a crimped projecting portion of the associated frame segment outer wall to fix the body portion to the frame segment in the same manner as described in reference to the body portions of the connectors 80.

The body portions 132, 134 are secured together to fix the frame segment free ends and complete the spacer frame assembly. While the body portions can be locked or bonded together by a number of suitable techniques, the preferred connector 130 employs a mechanical latching arrangement 142 for automatically locking the body portions in place when the frame segment free ends are properly positioned. The latching arrangement comprises a pair of latching projections 144 carried by the body portion 132 which coact with a keeper 146 carried by the body portion 134. The projections 144 are identical to the latching projection 112 and project from the body portion 132 with their ramps 147 facing generally away from each other so that the catch surfaces 148 extend oppositely.

The keeper 146 is formed by an opening in the body portion 134 defining opposite sides against which the ramps of the respective latching projections slide as the frame segment corners are joined together. The latching projections are resiliently deflected toward each other as the ramps move into the opening. When the projecting ends of the latching projections have moved fully into the opening the catch surfaces are snapped into position for engaging their respective keeper surfaces (as illustrated by FIG. 8) and prevent separation of the body portions 132, 134. The locating faces 136, 138 engage or closely confront each other when the body portions are locked together and the latch arrangement and locating faces thus coact to rigidify the frame corner. The locating faces 136, 138 are provided with central relieved areas which, like the relieved areas 106 of the connector 80, provide a volume for excess sealant material which might otherwise be trapped between and prevent proper alignment of the locating faces.

Figure 11:
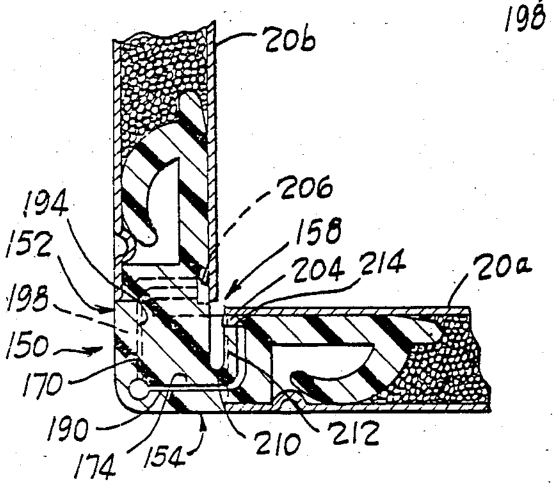
FIG. 11 is a view like FIG. 10 with the connector illustrated in a position for locking the frame segments together to form a frame corner; and, FIG. 12 is a view similar to FIGS. 10 and 11 illustrating the connector in an intermediate position.

A modified frame segment connector 150 constructed according to the invention is illustrated by FIGS. 9–12 of the drawings. The connector 150 comprises first and second body portions 152, 154 connectable with adjacent ends of spacer frame segments 20*a*, 20*b*; a hinge 156 for enabling pivotal movement of the body portions 152, 154 to facilitate formation of a frame corner; and, a connecting arrangement 158 for securing the body portions in place with respect to each other when the frame segments are in their desired assembled orientation (FIG. 11). In the illustrated embodiment the frame segments form a right angle corner; but other relative orientations of the frame segments are possible.

The body portion 154 includes a frame segment engaging end region 160 projecting into the frame segment 20*a* and a connecting end region 162 projecting from the end of the frame segment. The end region 160 includes a hook-like construction 164 locked into place in the frame segment and a plug section 166 conforming to the cross sectional shape of the frame segment for sealing the frame segment end against loss of desiccant material. The hook construction 164 engages a crimped wall portion of the frame segment so that the body portion 154 is securely fixed in the frame segment end.

The hinge 156 is disposed between the body portions 152, 154 to enable pivoting the frame segments with respect to each other to form a frame corner during the spacer frame assembly. The preferred hinge structure is formed by a thin strip of flexible material formed continuously with the respective body portions and extending between them throughout their lateral extents.

The connector 150 is preferably formed from a single piece of plastic material, such as nylon, polypropylene, or polyethylene, molded so that the hinge strip is continuous with the body portions. The hinge strip is sufficiently thin and supple to provide flexibility for pivoting the frame segments; but is strong and stiff enough to aid in resisting skewing of the frame segments with respect to each other when the corner has been formed. In the illustrated embodiment of the invention the hinge strip is provided with undercut areas 156*a* adjacent its ends to enable the body portions to be moved into a frame corner-forming orientation with respect to each other without unduly stressing the hinge strip material.

The body portion end region 162 forms abutment surfaces which confront correlative abutment surfaces of the body portion 152 when the frame corner is formed to assist in rigidifying the frame corner. In the preferred and illustrated connector three abutment surfaces, 170, 172, 174 are formed on the end region 162 and disposed in orthogonal planes. The surfaces 170, 172 are formed on a wall 176 extending along one lateral side of the connector 150 with the surface 172 disposed along the mid-line 177 of the connector (as viewed in FIG. 9). The abutment surface 174 is formed by a wall 178 extending transversely across the connector mid-line from the wall 176.

The body portion 152 is configured similarly to the body portion 154, having a frame segment engaging end region 180 projecting into the frame segment 20*b* and a connecting end region 182 projecting from the end of the frame segment. A hook-like construction 184 locks the end region 182 in the frame segment and a plug section 186 seals the frame segment end against loss of desiccant.

Orthogonal abutment surfaces 190, 192, 194 corresponding, resepctively, to the surfaces 170, 172, 174 are formed on the end region 182, but on the opposite side of the connector mid-line 177. The surfaces 190, 192 are formed on an end region wall 196 while the surface 194 is formed on an end region wall 198.

When the connector 150 is flexed to form the frame corner, as illustrated by FIG. 11, the correlative abutment surface pairs 170, 194; 172, 192; and 174, 190 are moved into confronting relationship and serve to stiffen the frame corner by preventing excessive flexure of the frame corner (i.e. preventing the illustrated frame corner from flexing to an acute angle materially less than 90°, and resisting skewing of the frame segments (by virtue of engagement of the surfaces 172, 192).

It should be appreciated that the angular relationships between the abutment surfaces on each connector body portion can be altered if desired and still permit formation of a 90° frame corner. Likewise the abutment surface may be altered to produce frame corner angles different from 90° if that should be desirable. Furthermore the abutment surfaces need not necessarily be planar, although the correlative abutment surface pairs should, most desirably, conform to each other.

The connecting arrangement 158 is constructed and arranged to firmly latch the body portions 152, 154 in position with respect to each other when the frame corner is formed. As illustrated by FIGS. 9–12, first and second latching projections 200, 202 are formed, respectively, on the first and second body portions 152, 154. When the frame corner is formed (FIG. 11), the projections are moved into latching relationship with first and second keepers 204, 206 formed, respectively, on the second and first body portions 154, 152. The reciprocal latching engagement between the body portions provides an extremely strong locking relationship between the body portions so that "opening" of the frame corner is strongly resisted.

The first locking projection 200 is formed continuously with the wall 196, extends substantially across the width of the wall and has a generally "L" shaped configuration. A short, stiff leg 210 extends from the end of the wall 176 adjacent the abutment surface 190 in the direction of the "inside" of the spacer frame periphery. A relatively longer, resiliently deflectable leg 212 extends from the leg 210 parallel to and spaced from the body portion 154 toward the frame segment 20*b*.

The first keeper 204, associated with the latching projection 200, is formed by a wall-like lip extending from the surface 172, contiguous with the wall 178 and aligned with the latching projection 202. The lip 204 is preferably slightly wider than the projection 200 and quite short so that it is stiffly resistant to flexure.

Figure 12:
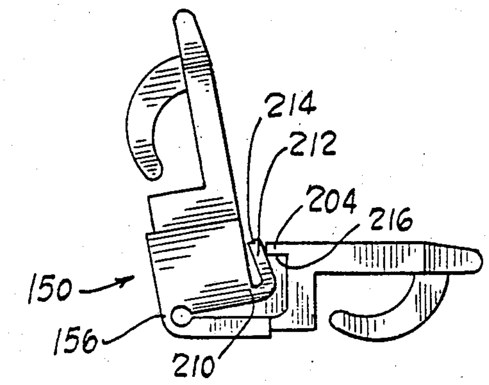

When the body portions 152, 154 are pivoted to form the frame corner the keeper lip 204 engages the leg 212 and resiliently deflects the leg toward the wall 196 (see FIG. 12). The extent of the leg 210 is sufficient to insure that the leg 212 flexes without interference with the wall 196. The lip 204 slides along and resiliently deflects the leg 212 as the body portions are pivoted until the leg is free to resiliently snap back to its unflexed condition at which time the tip 214 of the leg 212 is in confronting relationship with a catch surface 216 formed by the lip 204. This condition is illustrated by FIG. 11.

If the frame corner is stressed in a manner tending to straighten out the corner the leg tip 214 engages the catch surface 216, placing the leg 212 in compression and resisting the motion. The leg 210 is sufficiently short and stiff that it strongly resists being flexed when the corner tends to be straightened.

The second latching projection 202 is constructed the same as the projection 200 but is formed on the wall 176. The leg 220 extends from the wall 176 while the resiliently deflectable leg 222 extends parallel to and spaced from the wall. The keeper lip 206 extending from the wall 196 is constructed like the lip 204. Thus the lip 206 resiliently deflects the leg 222 as the body portions are pivoted and when the tip 224 of the leg 222 passes the lip 206 the leg 222 springs back to its unflexed condition so that the leg tip 224 confronts the catch surface 226 of the lip 206 and latches the body portions in their corner forming positions.

The latching projections and their associated keepers are preferably constructed identically and positioned the same relative to each other so that both latching projections are latched in place with their respective keepers at the same time and just when the body portions are properly positioned to form the frame corner.

While different embodiments of the invention have been illustrated and described in detail, the present invention should not be considered limited to the precise constructions and techniques disclosed. Various adaptations, modifications and uses of the invention may occur to those skilled in the art to which the invention relates and the intention is to cover all such adaptations, modifications and uses falling within the spirit or scope of the appended claims.

What is claimed is:

1. A method of constructing a spacer frame for an insulating glass panel from four separate open ended spacer frame segments interconnected at their ends by corner connectors at least three of which have projecting body portions which are hinged together comprising:

(a) loading desiccant material into at least one of said frame segments;

(b) attaching respective projecting body portions of one corner connector to adjacent ends of the first and second frame segments to hingedly interconnect said first and second frame segments;

(c) attaching respective projecting body portions of a second corner connector to adjacent ends of the second and third frame segments to hingedly interconnect said second and third frame segments;

(d) attaching respective projecting body portions of a third corner connector to adjacent ends of the third and fourth frame segments to hingedly interconnect said third and fourth frame segments;

(e) moving said interconnected frame segments successively through a sealant applying station; including (i) positioning said interconnected spacer frame segments in end to end alignment; and (ii) moving said aligned spacer frame segments along a substantially linear path of travel extending through said sealant applying station;

(f) applying sealant material to at least one side of the spacer frame segments passing through said station;

(g) pivoting each spacer frame segment relative to the adjacent frame segment about the hinge of the interposed corner connector to form a substantially rectangular frame shape; and, (h) securing adjacent ends of said frame segments against relative pivotal movement.

2. The method claimed in claim 1 wherein securing adjacent ends of said frame segments together includes rigidly interconnecting the adjacent ends of said first and fourth frame segments.

3. The method claimed in claim 1 wherein moving said spacer frame segments through said sealant applying station comprises supporting said spacer frame segments on substantially linear conveying paths extending in opposite directions from said sealant applying station.

4. The method claimed in claim 3 further including frictionally engaging said spacer frame segments with a conveying surface and moving said surface at predetermined speeds toward said sealant applying station to deliver said frame segments to said sealant applying station.

5. The method claimed in claim 4 further including stationing a second spacer frame segment conveying surface adjacent said sealant applying station and moving said second conveying surface away from said sealant applying station when the spacer frame segments are emerging from said sealant applying station.

6. The method claimed in claim 5 further including driving said conveying surfaces from a common motive power source and coordinating the conveying speeds thereof.

7. The method claimed in claim 1 further including detecting the approach of the leading end of said interconnected spacer frame segments to said sealant applying station, applying a continuous body of said sealant to said at least one side in response to detection of said leading spacer frame segment end, detecting the approach of the trailing end of said interconnected spacer frame segments to said sealant applying station and terminating the application of said sealant body in response to detection of said trailing spacer frame segment end.

8. The method claimed in claim 2 further including attaching a projecting body portion of a fourth corner connector to an end of one of said first and fourth spacer frame segments prior to moving said frame segments through said sealant applying station and wherein securing adjacent ends of said spacer frame segments comprises attaching the other projecting connector body portion of said fourth corner connector to the end of the other of said first and fourth spacer frame segments.

* * * * *